No. 694,873. Patented Mar. 4, 1902.
E. J. MALLEN.
PIPE COLLAR.
(Application filed May 28, 1901.)
(No Model.)
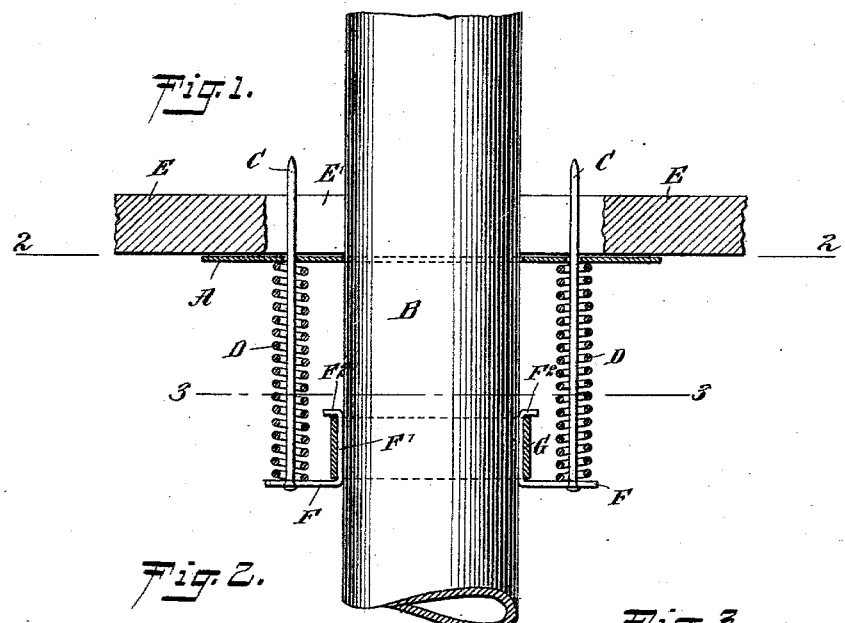
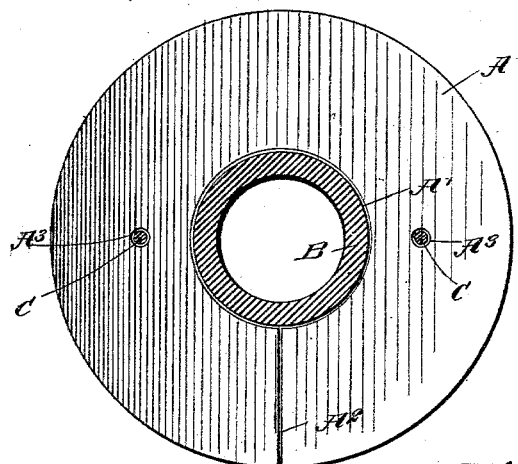
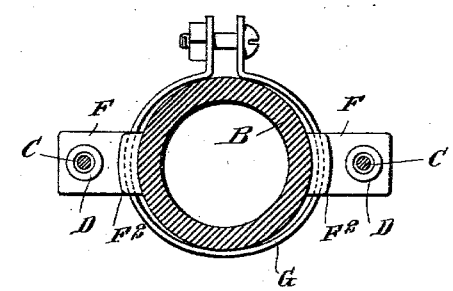
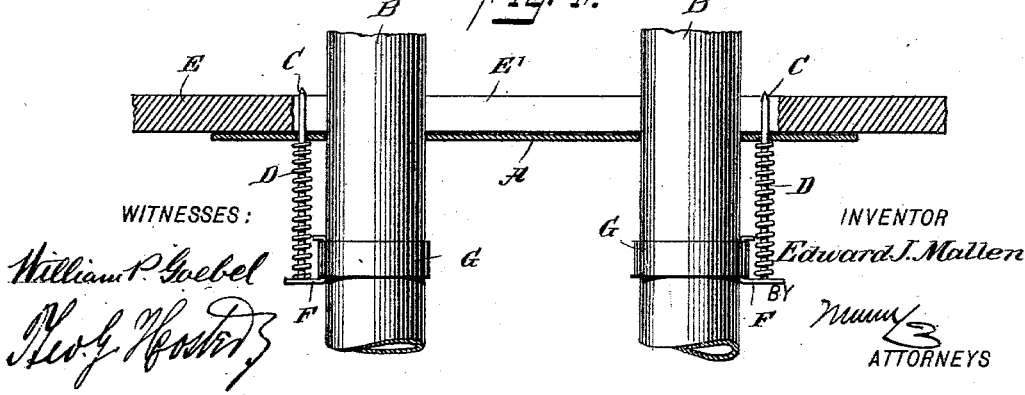
WITNESSES:
INVENTOR
Edward J. Mallen
BY
ATTORNEYS

UNITED STATES PATENT OFFICE.

EDWARD J. MALLEN, OF NEW YORK, N. Y.

PIPE-COLLAR.

SPECIFICATION forming part of Letters Patent No. 694,873, dated March 4, 1902.

Application filed May 28, 1901. Serial No. 62,260. (No model.)

*To all whom it may concern:*

Be it known that I, EDWARD J. MALLEN, a citizen of the United States, and a resident of the city of New York, borough of Manhattan, in the county and State of New York, have invented a new and Improved Pipe-Collar, of which the following is a full, clear, and exact description.

The object of the invention is to provide a new and improved collar or ceiling-plate designed for use on steam and other pipes where they pass through ceilings, floors, or walls to close the opening in the same, and thereby give a neat finish to the pipe, the ceiling, floor, or wall, the collar being readily applicable to flat or curved surfaces, the arrangement being such that the collar can be readily placed in position on the pipes after the latter are set up, and the position of the collar is not affected whether the expansion of the pipe is in an upward or downward direction.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a section of the improvement as applied. Fig. 2 is a sectional plan view of the same on the line 2 2 in Fig. 1. Fig. 3 is a similar view of the same on the line 3 3 in Fig. 1, and Fig. 4 is a side elevation of the same with part in section and as applied to a plurality of pipes.

The improvement consists, essentially, of a plate A, of sheet metal or other suitable material, and formed with one or more openings A' for the passage of a pipe or pipes B, the plate having slits $A^2$ leading from the outer edge of the plate to the openings A', so that said plate can be readily placed in position on the pipe or pipes after the latter are in place. As illustrated in Figs. 1, 2, and 3, the plate A is provided with a single opening for the passage of the pipe B and is mounted to slide vertically on guide-rods C, on which are coil-springs D, pressing against the under side of the plate A to hold the same in firm contact with the ceiling, floor, or wall E to close the opening E' therein, as will be readily understood by reference to Fig. 1. The lower ends of the springs D rest on arms F, held on a clamp or clip G, encircling the pipe B, and fastened thereto in the usual manner by a bolt engaging the ends of the clip, as is plainly indicated in Fig. 3. Each of the arms F is provided with an upwardly-extending shank F' for engaging the clip G at the outside thereof and extending between the clip and the pipe B, and the upper end of the shank F' is formed with an outwardly-extending flange $F^2$, adapted to rest on the top edge of the clip, so that when the latter is in place the arms F are securely held in position, and thereby support the guide-rods C and the springs D to hold the plate A in firm contact with the ceiling, floor, or wall E. As the clip G is vertically adjustable on the pipe B, it is evident that the springs D can be compressed to any desired degree to hold the plate A in firm contact with the ceiling, floor, or wall, no matter in which direction expansion or contraction of the pipe B takes place.

When the device is applied to two pipes, as shown in Fig. 4, then the plate A is formed with a corresponding number of apertures A' for the passage of said pipes, and in this case the plate A is mounted on guide-rods C and is pressed by springs D; but the guide-rods are held on arms F, attached to clips G, independently secured to the two pipes B. It is understood that the guide-rods C extend loosely through apertures $A^3$ in the plate A, so that upon expansion or contraction of the pipes B the guide-rods move freely with the arms F and clips G; but the springs D hold the plate in firm contact with the ceiling, floor, or wall. By making the plate A with a split or splits it is evident that the parts adjacent to the split can be readily bent apart to apply the plate to the pipe, so that the device can be readily attached to pipes already set up in a building. The plate A is sufficiently flexible to permit of opening it according to the surface of the ceiling, floor, or wall on which the device is applied, so as to give at all times a neat appearance to the pipe and the room.

Having thus fully described my invention, I claim as new and desire to secure by Letters Patent—

1. A pipe-collar, comprising a plate for engaging a pipe, guide-rods for the plate, arms carrying the guide-rods, springs on said guide-rods and resting on said arms, for pressing the plate against a ceiling, floor or wall, and a clip on the pipe and carrying said arms, as set forth.

2. A pipe-collar, comprising a plate for engaging a pipe, guide-rods for the plate, arms carrying the guide-rods, and having shanks and flanges, springs on said guide-rods and resting on said arms, for pressing the plate against a ceiling, floor or wall, and a clip on the pipe and carrying said arms, said clip being engaged at the inside by said shanks and the top edge by said flanges, as set forth.

EDWARD J. MALLEN.

Witnesses:
 THEO. G. HOSTER,
 EVERARD B. MARSHALL.